(12) United States Patent
Mori

(10) Patent No.: US 10,446,947 B2
(45) Date of Patent: Oct. 15, 2019

(54) CLIP FOR GROUNDING

(71) Applicant: NIFCO INC., Yokosuka-shi, Kanagawa (JP)

(72) Inventor: Daisuke Mori, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 16/091,827

(22) PCT Filed: Apr. 26, 2017

(86) PCT No.: PCT/JP2017/016575
§ 371 (c)(1),
(2) Date: Oct. 5, 2018

(87) PCT Pub. No.: WO2017/208691
PCT Pub. Date: Dec. 7, 2017

(65) Prior Publication Data
US 2019/0089073 A1    Mar. 21, 2019

(30) Foreign Application Priority Data

May 31, 2016    (JP) .................................. 2016-108855

(51) Int. Cl.
*H01R 4/64*    (2006.01)
*B60K 15/05*   (2006.01)

(52) U.S. Cl.
CPC .............. *H01R 4/64* (2013.01); *B60K 15/05* (2013.01); *H01R 2201/26* (2013.01)

(58) Field of Classification Search
CPC .. H01R 4/64; H01R 2201/26; H01R 13/6485; H01R 13/2414; H01R 13/6596; H01R 13/6584; B60K 15/05

USPC ......... 439/92, 86, 89, 95, 96, 101, 939, 567, 439/844

See application file for complete search history.

(56) References Cited

U.S. PATENT DOCUMENTS 7,134,170 B2 * 11/2006 Gibbons ................. F16B 5/065
                                                        24/289
7,320,157 B2 *  1/2008 Lubera .................. B60N 3/026
                                                        24/295

(Continued)

FOREIGN PATENT DOCUMENTS

JP    2001-260666 A    9/2001
JP    2005-127357 A    5/2005

(Continued)

OTHER PUBLICATIONS

PCT/ISA/210, "International Search Report for International Application No. PCT/JP2017/016575," dated Jul. 4, 2017.

*Primary Examiner* — Travis S Chambers
(74) *Attorney, Agent, or Firm* — Manabu Kanesaka

(57) ABSTRACT

A clip for grounding includes a grommet member made of a conductive resin, electrically connected to a grounding processing object, and fitted into an attachment hole formed in a nonconductive attachment object so as to link the grounding processing object to the attachment object; and a contact member made of metal, combined with the grommet member, and provided with an elastic contact portion relative to a reference potential member positioned on a fitting tip side of the grommet member.

5 Claims, 17 Drawing Sheets

(56) References Cited

U.S. PATENT DOCUMENTS

2004/0077194 A1* 4/2004 Otto ................. B60K 15/00
                                                                                    439/100
2011/0017738 A1   1/2011 Sato et al.

FOREIGN PATENT DOCUMENTS

| JP | 2009-061974 A | 3/2009 |
| JP | 2013-222527 A | 10/2013 |

* cited by examiner

CLIP FOR GROUNDING

FIELD OF TECHNOLOGY

The present invention relates to a clip for grounding.

BACKGROUND ART

As for a terminal for grounding made of carbon fiber-reinforced plastic comprising an insertion portion to be inserted into an opening of a reference potential member while contracting by an elastic deformation; and an engagement portion engaging the opening by an elastic return after an insertion, there is a terminal for grounding shown in Patent Document 1.

However, the terminal for grounding of the Patent Document 1 merely links an insulated wire to a reference potential member. Also, since the terminal for grounding is made of plastic, an elastic force thereof is not permanently maintained. Plastic products easily cause a reduction of the elastic force by a creep deformation especially under a high temperature and high stress. In a case wherein the elastic force of the terminal for grounding is reduced, an engagement state with the reference potential member, i.e., an electrical connection state between the insulated wire and the reference potential member is damaged.

PRIOR ART DOCUMENT

Patent Document

Patent Document 1: Japanese Unexamined Patent Application Publication No. 2013-222527

SUMMARY OF THE INVENTION

Problems to be Solved by the Invention

A main object of the present invention is to appropriately provide a function of linking a grounding processing object to a nonconductive attachment object, and in association with this linking, a function of electrically connecting the grounding processing object to a reference potential member, in this type of clip for grounding.

Means for Solving the Problems

In order to obtain the aforementioned object, in the present invention, a clip for grounding comprises a grommet member made of a conductive resin, electrically connected to a grounding processing object, and fitted into an attachment hole formed in a nonconductive attachment object so as to link the grounding processing object to the attachment object; and a contact member made of metal, combined with the grommet member, and provided with an elastic contact portion relative to a reference potential member positioned on a fitting tip side of the grommet member.

By a contact to the reference potential member of the elastic contact portion, even in a case wherein the attachment hole is provided in the attachment object, the grounding processing object can be appropriately electrically connected to the reference potential member through the clip for grounding. The elastic contact portion is formed by one portion of the contact member made of metal, so that an elastic deformation force is difficult to be lost over time, and the elastic contact portion continues to contact the reference potential member with a fixed elastic force. Also, since the elastic contact portion can contact the reference potential member, for example, a body panel of an automobile with the fixed elastic force, even in a case wherein there is a slight error in a positional relationship between the attachment hole and a portion which becomes a contact point of the reference potential member, the aforementioned error is absorbed so as to contact the elastic contact portion with the reference potential member.

In one aspect of the present invention, the grommet member includes wall portions respectively on both sides sandwiching a center portion; the contact member includes a pair of elastic engagement pieces to be inserted into an insertion gap formed between the center portion and the wall portions from a tip side of the grommet member; and by an elastic return of the elastic engagement piece at an insertion end position into the insertion gap, an engagement portion of the elastic engagement piece engages an exit portion of the insertion gap.

Also, in one aspect of the present invention, the contact member includes a pair of elastic clamping pieces to be inserted into the insertion gap from the tip side of the grommet member; and in a state wherein the center portion is clamped between the pair of elastic clamping pieces, the contact member is combined with the grommet member.

Also, in one aspect of the present invention, the center portion of the grommet member has a cylindrical shape in which the tip side of the grommet member is closed, and a base portion side is open; the clip for grounding includes a pin member to be fitted into the center portion from the base portion side; and the pin member inserted to pass through a hole formed in one portion of the grounding processing object fits into the center portion so as to electrically connect the grounding processing object and the grommet member.

Also, in one aspect of the present invention, the grommet member includes a flange on the base portion side, and is provided with a packing member for sealing fluid-tightly between the flange and the attachment hole.

Also, in one aspect of the present invention, the grounding processing object is a cap of a fuel filling aperture of the automobile, and a conductive tether connected to the cap; the attachment object is a fuel-filling-aperture forming member wherein an inside thereof is an insertion space for a fueling gun; the reference potential member is the body panel of the automobile; and by the clip for grounding, the cap is connected to the fuel-filling-aperture forming member side in a grounding processing state.

Effect of the Invention

According to the present invention, the function of linking the grounding processing object to the nonconductive attachment object, and in association with this linking, the function of electrically connecting the grounding processing object to the reference potential member, can be appropriately provided in the clip for grounding.

BEST MODES OF CARRYING OUT THE INVENTION

Hereinafter, a typical embodiment of the present invention will be explained with reference to FIG. 1 to FIG. 22. A clip for grounding according to the present embodiment has a function of linking a grounding processing object 1 to a nonconductive attachment object 2 shown in FIG. 21 to FIG. 22, and also in association with this linking, a function of electrically connecting the grounding processing object 1 to a reference potential member 3 shown in FIG. 21 to FIG. 22.

Figure 21:
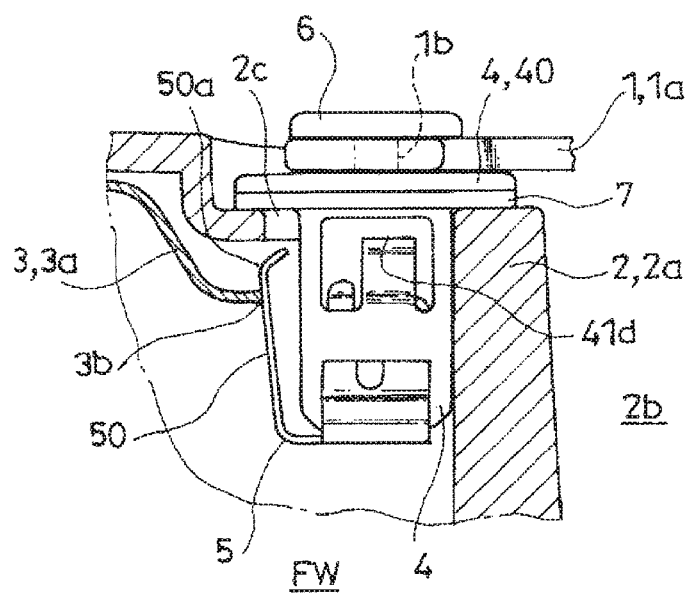
FIG. 21 is a cross-sectional structural view showing a linked state in FIG. 20.

FIG. 21 shows an example wherein the grounding processing object 1 is a cap (not shown in the drawings) of a fuel filling aperture of an automobile, and a conductive tether 1a connected to the cap; the attachment object 2 is a fuel-filling-aperture forming member 2a wherein an inside thereof is an insertion space 2b for a fueling gun; and the reference potential member 3 is a body panel 3a of the automobile.

Although the fuel-filling-aperture forming member 2a is formed of a nonconductive synthetic resin, the clip for grounding is connected to the cap through the tether 1a, and an elastic contact portion 50 of the later-described contact member 5 contacts the body panel 3a positioned on an inner face side of the fuel-filling-aperture forming member 2a, so that the cap is connected to the fuel-filling-aperture forming member 2a in a state wherein grounding processing is carried out.

In an illustrated example, the later-described pin member 6 inserted to pass through a hole 1b formed in one end portion of the tether 1a as one portion of the grounding processing object 1 fits into a center portion 41a (see FIG. 10) of the later-described grommet member 4 so as to electrically connect the grounding processing object 1 and the grommet member 4. Thereby, in the illustrated example, the cap connected to the other end portion of the tether 1a around the pin member 6 is connected to the fuel-filling-aperture forming member 2a in a turnable state.

In the present embodiment, the clip for grounding is formed by the grommet member 4, the contact member 5, the pin member 6, and a packing member 7.

The grommet member 4 is made of a conductive resin. The pin member 6 is typically formed of a material having a conductive property as well, and it is typically preferably made of the conductive resin. The contact member 5 is made of metal, and has the conductive property.

(Grommet Member 4)

The grommet member 4 is electrically connected to the grounding processing object 1, and fits into an attachment hole 2c formed in the nonconductive attachment object 2 so as to have a structure of linking the grounding processing object 1 to the attachment object 2.

Figure 1:
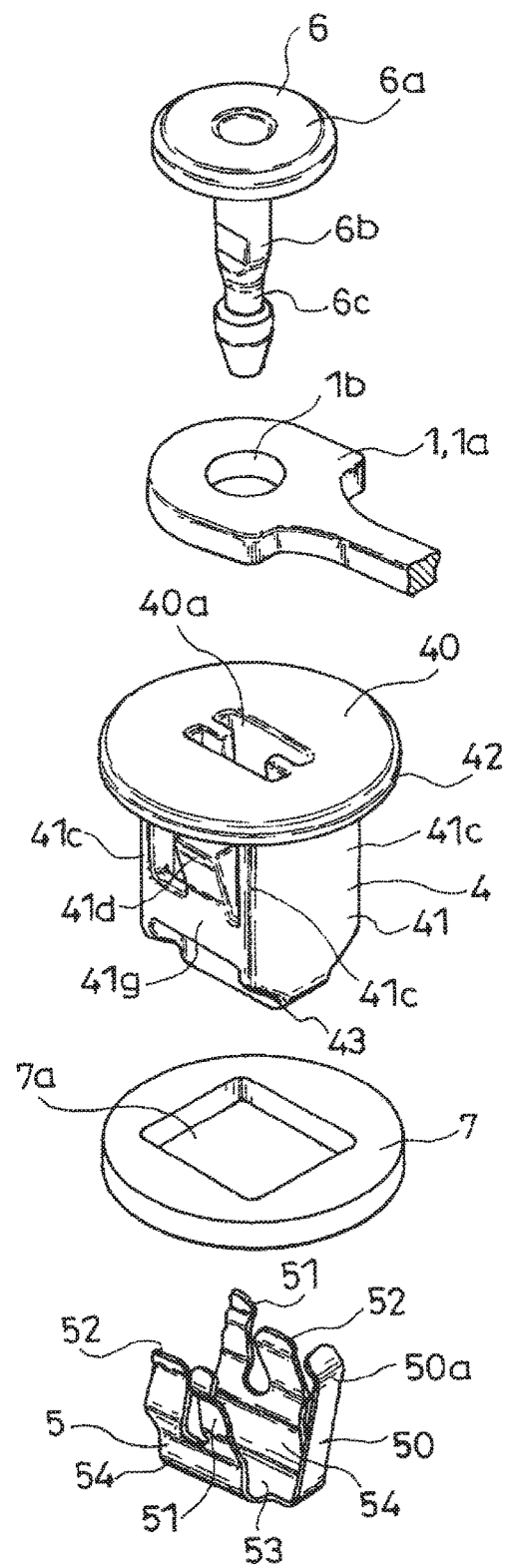
FIG. 1 is a disassembled perspective view of a clip for grounding according to one embodiment of the present invention.
Figure 2:
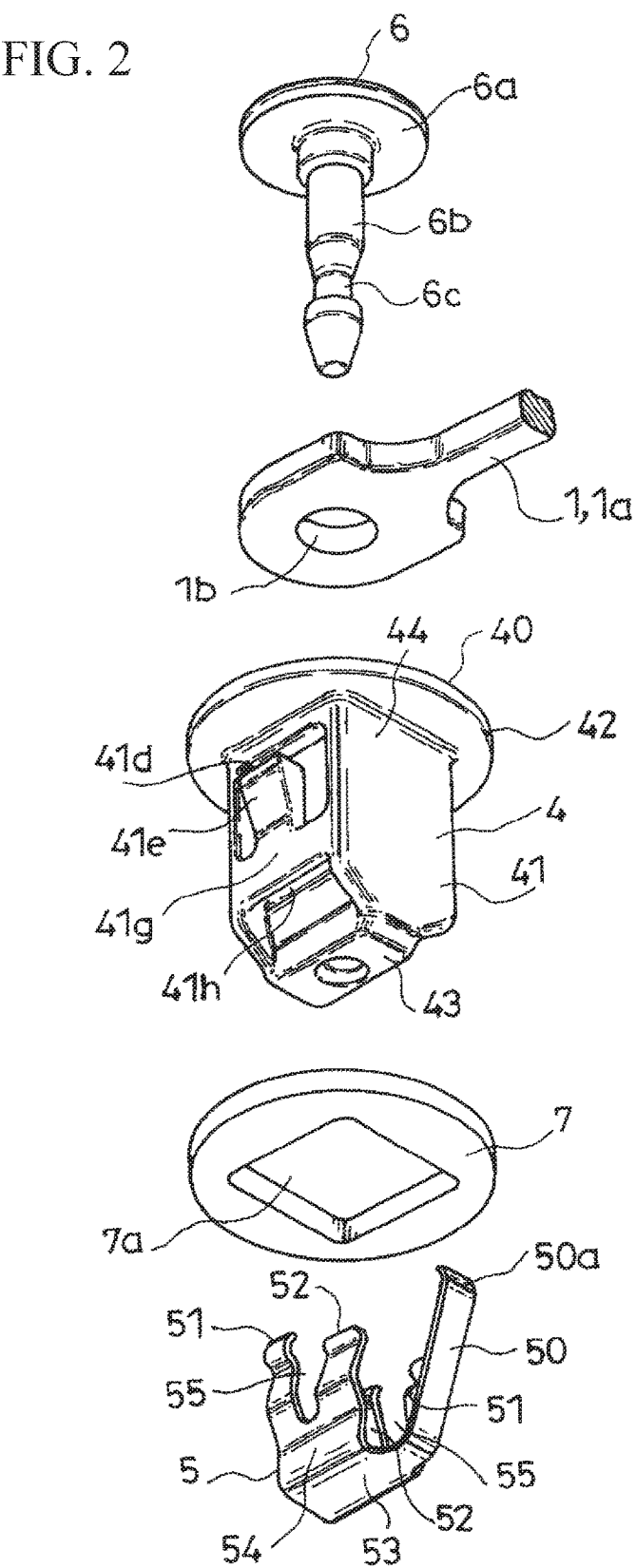
FIG. 2 is a disassembled perspective view of the clip for grounding viewed from a different direction.
Figure 3:
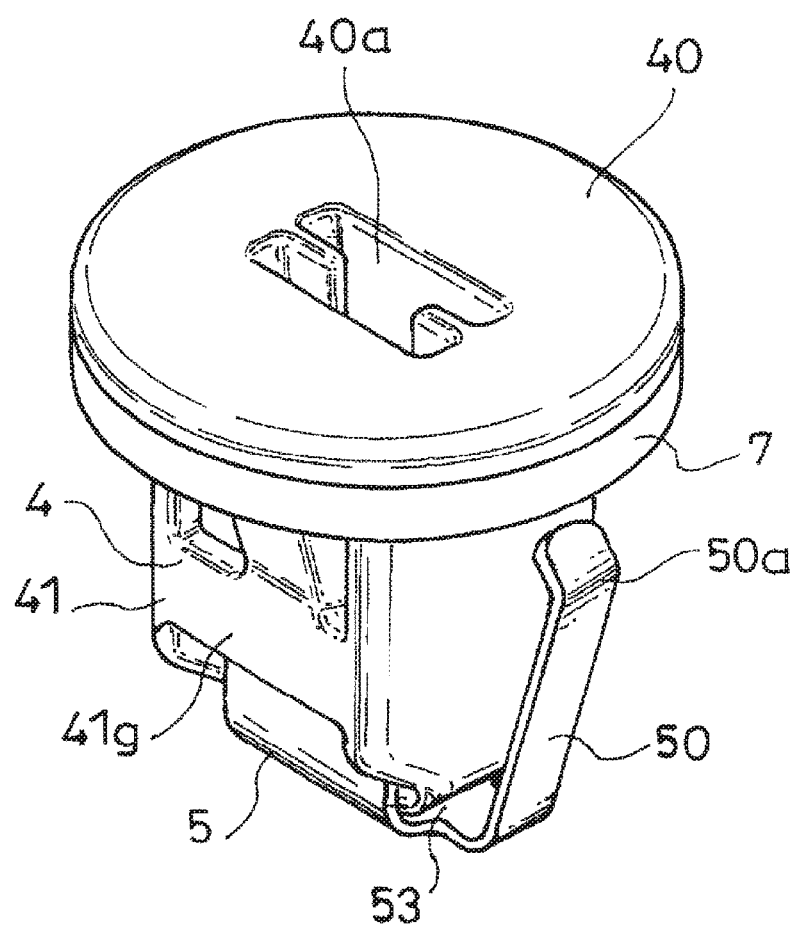
FIG. 3 is a perspective view wherein the clip for grounding is shown except for a pin member.
Figure 4:
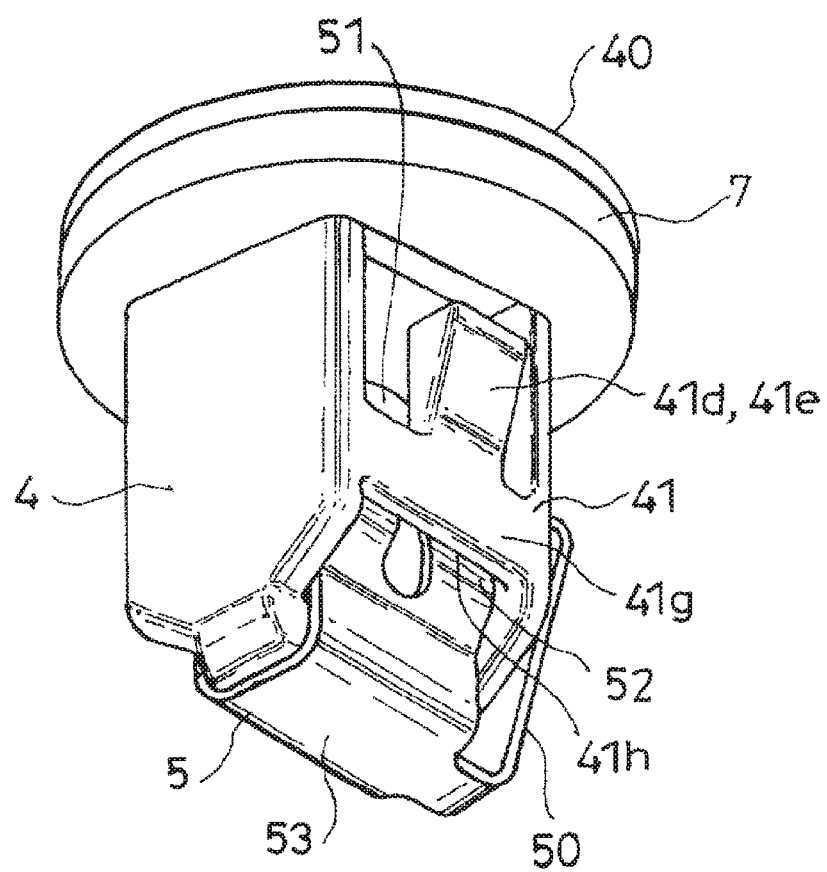
FIG. 4 is a perspective view wherein the clip for grounding is shown except for the pin member, and is viewed from a different direction.
Figure 5:
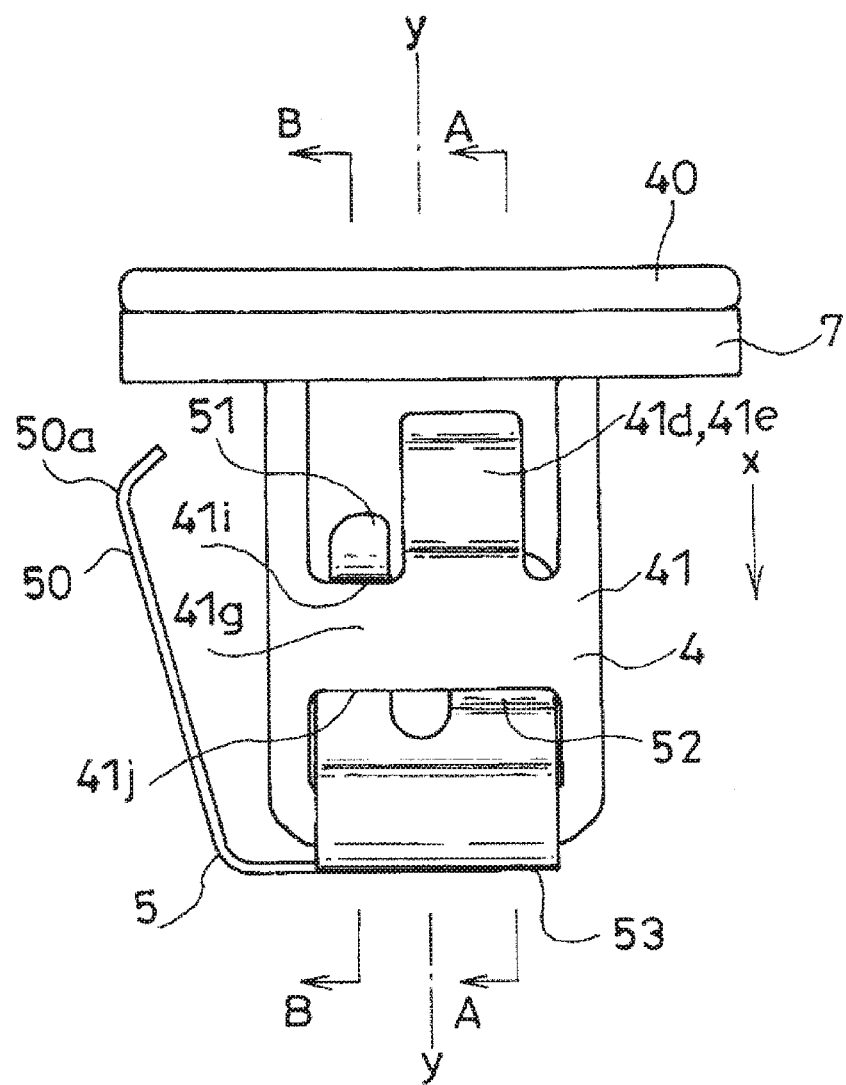
FIG. 5 is a side view wherein the clip for grounding is shown except for the pin member, and is viewed from a different direction.
Figure 6:
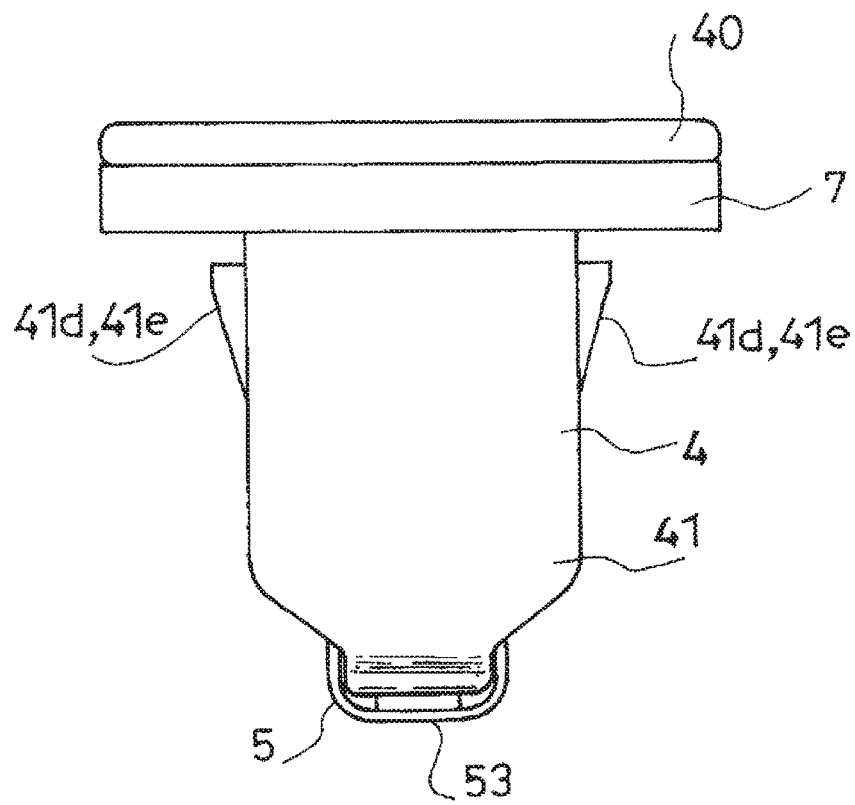
FIG. 6 is a side view wherein the clip for grounding is shown except for the pin member, and is viewed from a different direction.
Figure 7:
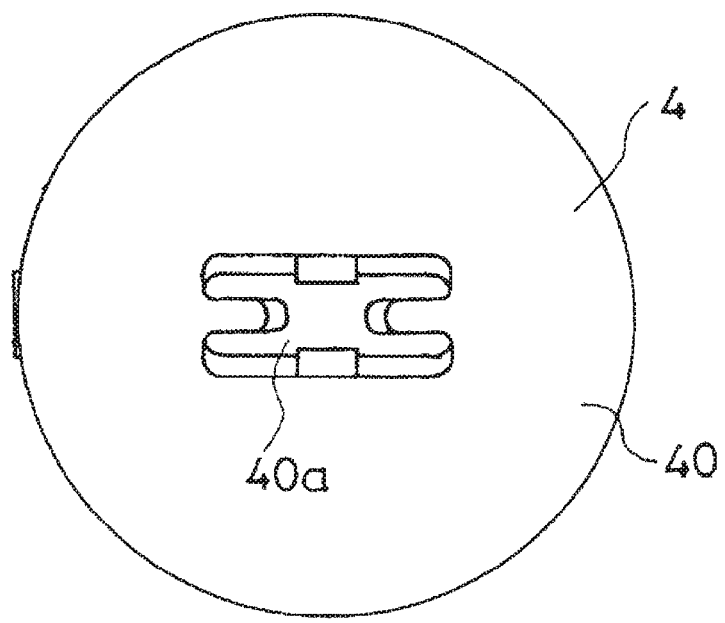
FIG. 7 is a plan view wherein the clip for grounding is shown except for the pin member.
Figure 8:
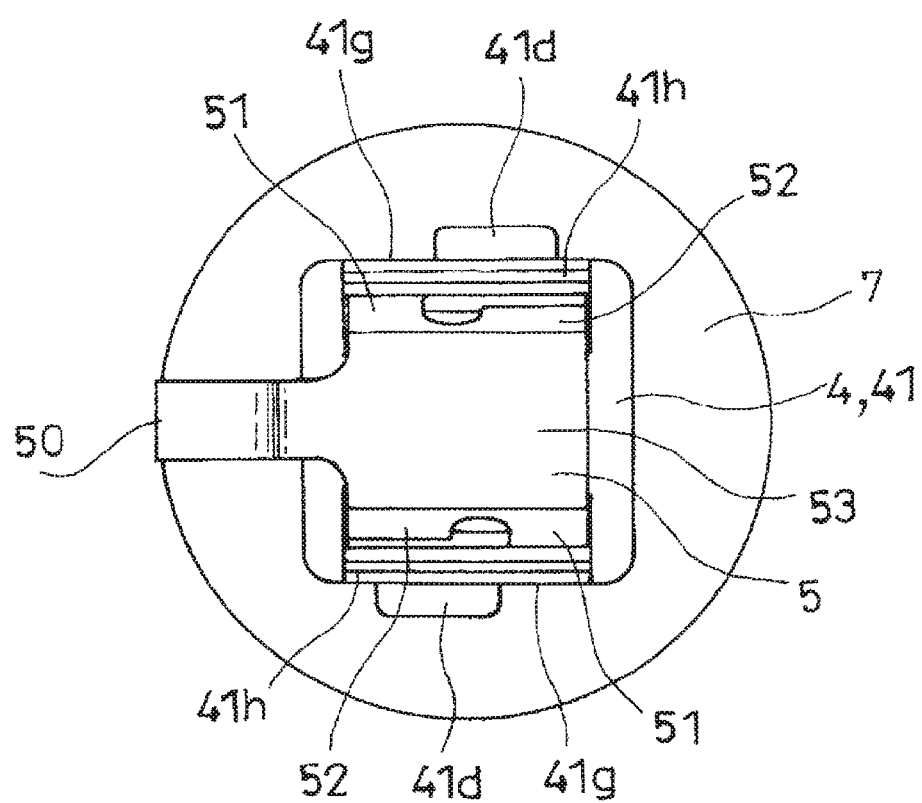
FIG. 8 is a bottom view wherein the clip for grounding is shown except for the pin member.

In the illustrated example, as shown in FIG. 1 and FIG. 2, the grommet member 4 comprises a disk-shaped head portion 40, and a fitting portion 41 into the attachment hole 2c. The head portion 40 has a size which does not enter into the attachment hole 2c. By the head portion 40, the grommet member 4 comprises a flange 42 forming an outer flange shape on a base portion 44 side thereof. The head portion 40 and the fitting portion 41 are integrated on one face side of the head portion 40.

As shown in FIG. 10 to FIG. 13, the fitting portion 41 includes the center portion 41a, a wall portion 41g, and an insertion gap 41h formed between the center portion 41a and the wall portions 41g.

The center portion 41a has a cylindrical shape in which a tip 43 side of the grommet member 4, i.e., a side which becomes an insertion side of the grommet member 4 relative to the attachment hole 2c, is closed, and the base portion 44 side which is opposite to the tip 43 side, is open. The center portion 41a is integrated with the head portion 40 on the base portion 44 side. In the illustrated example, the center portion 41a has a rectangular cylindrical shape wherein an outline shape in cross section in a direction orthogonal to a fitting direction x (see FIG. 5) is a rectangle. In the head portion 40, there is formed an insertion hole 40a of the pin member 6 (see FIG. 1), and the insertion hole 40a communicates with an inside of the center portion 41a.

Since the center portion 41a opens only on the base portion 44 side of the grommet member 4, in a state wherein the tether 1a as one portion of the grounding processing object 1 is attached to the fuel-filling-aperture forming member 2a as the attachment object 2, rainwater and the like do not enter into a vehicle inside of the automobile through the center portion 41a of the grommet member 4.

Figure 14:
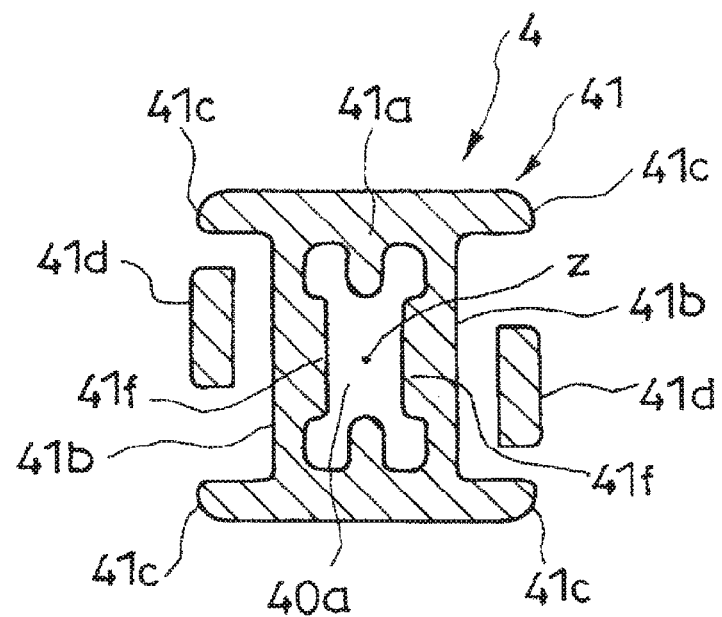
FIG. 14 is a cross-sectional view taken along a position of line D-D in FIG. 12.
Figure 15:
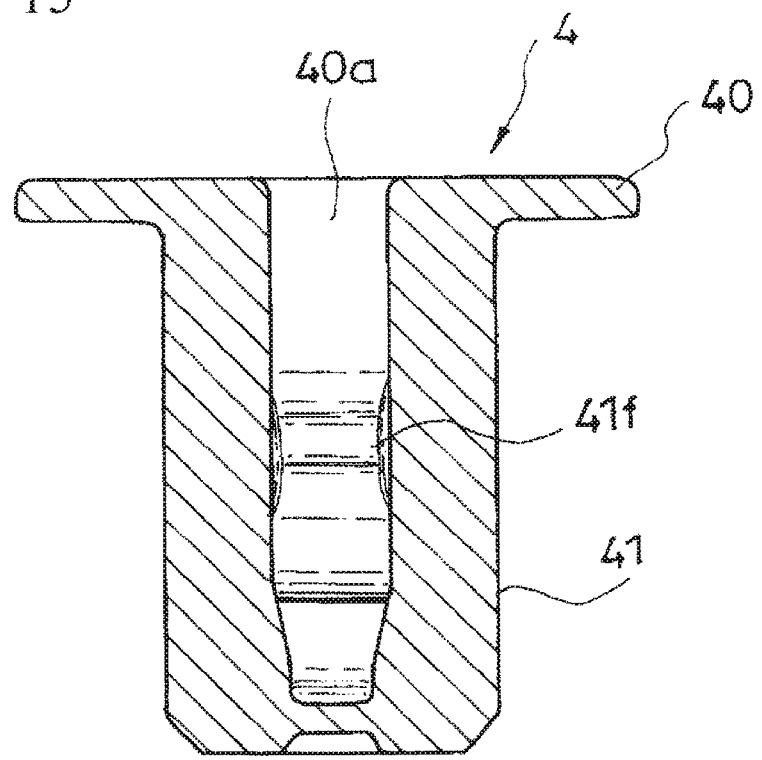
FIG. 15 is a cross-sectional view taken along a position of line E-E in FIG. 12.
Figure 16:
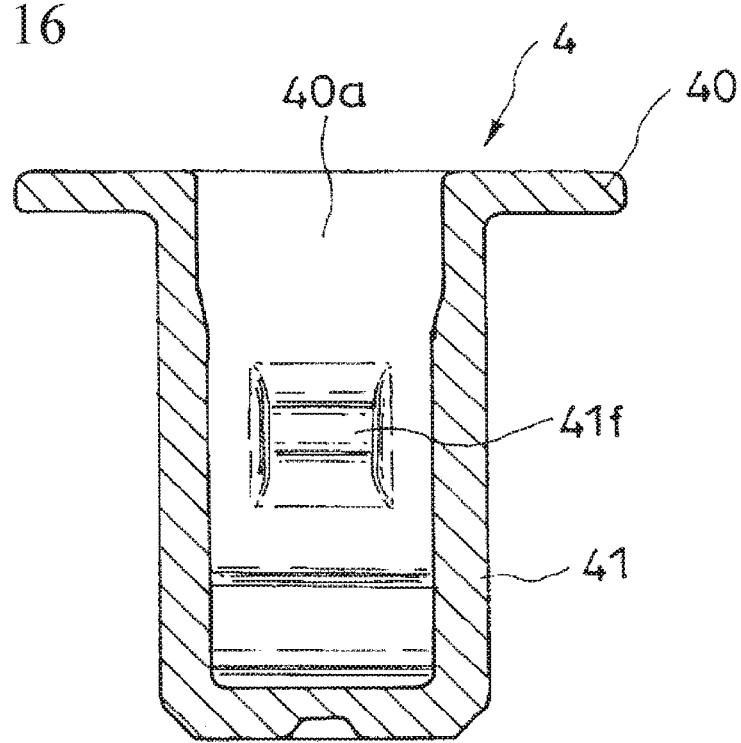
FIG. 16 is a cross-sectional view taken along a position of line F-F in FIG. 12.

As shown in FIG. 14, at four corner portions in the center portion 41a, there are respectively formed rib-shaped portions 41c projecting in a direction orthogonal to a long-side side face portions 41b of the center portion 41a.

Figure 13:
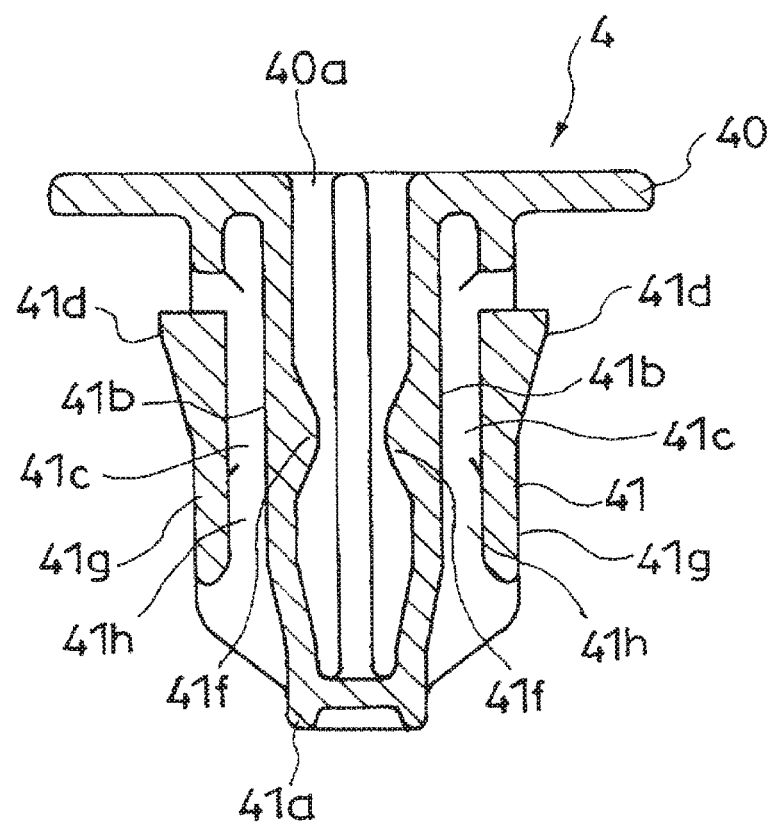
FIG. 13 is a cross-sectional view taken along a position of line C-C in FIG. 11.

As shown in FIG. 13, the wall portions 41g are respectively formed on an outside of two long-side side face portions 41b of the center portion 41a. The wall portion 41g has a band plate shape provided between the rib-shaped portions 41c and 41c positioned on both sides of one long-side side face portion 41b. The wall portion 41g is provided in a position between the tip 43 and the base portion 44 of the grommet member 4.

Figure 9:
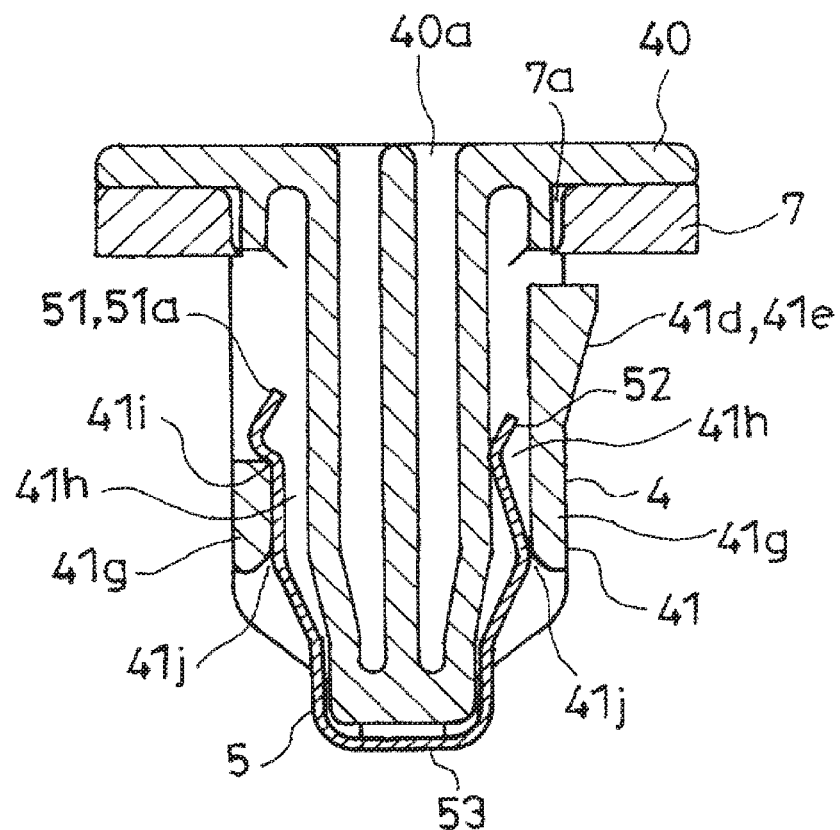
FIG. 9 is a cross-sectional view taken along a position of line B-B in FIG. 5.

As shown in FIG. 9, there is formed an exit portion 41i of the insertion gap 41h by an edge portion facing the base portion 44 side of the grommet member 4 in the wall portion 41g. Also, an entrance portion 41j of the insertion gap 41h is formed by an edge portion facing the tip 43 side of the grommet member 4 in the wall portion 41g.

Also, on the outside of the two long-side side face portions 41b and 41b of the center portion 41a, there are respectively formed engagement portions 41d engaging the attachment holes 2c on an insertion tip side, i.e., a fitting tip side Fw (see FIG. 21) when the grommet member 4 is inserted into the attachment hole 2c.

Figure 10:
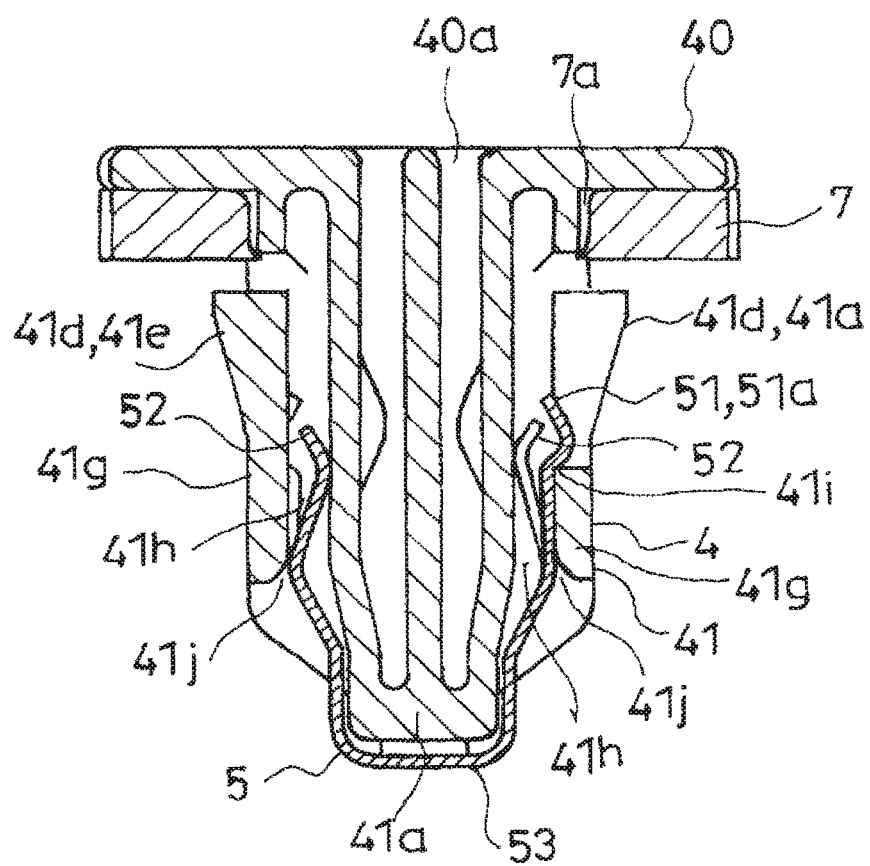
FIG. 10 is a cross-sectional view taken along a position of line A-A in FIG. 5.
Figure 11:
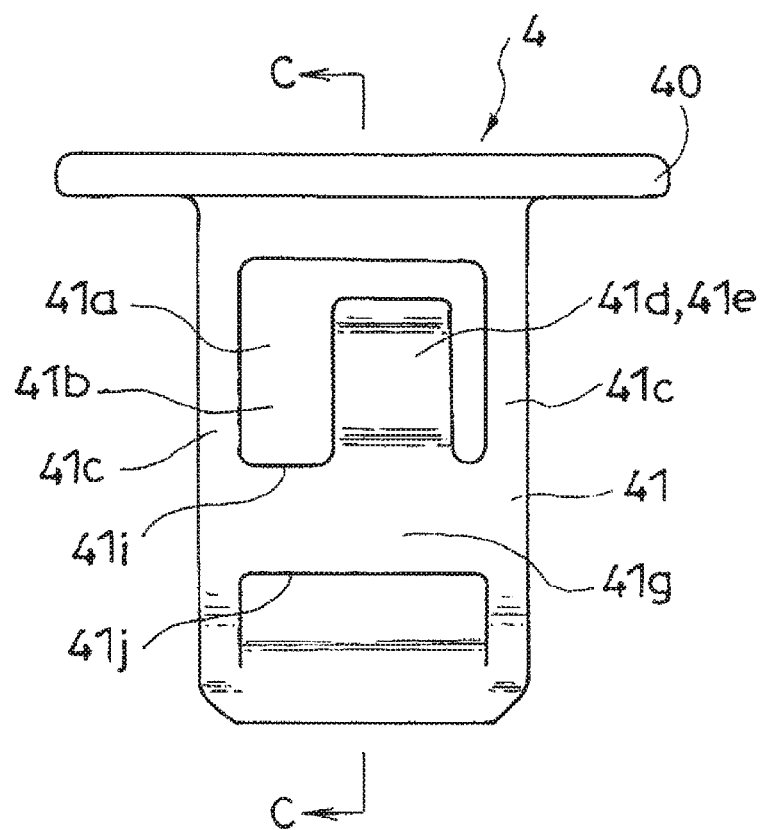
FIG. 11 is a side view of a grommet member forming the clip for grounding.
Figure 12:
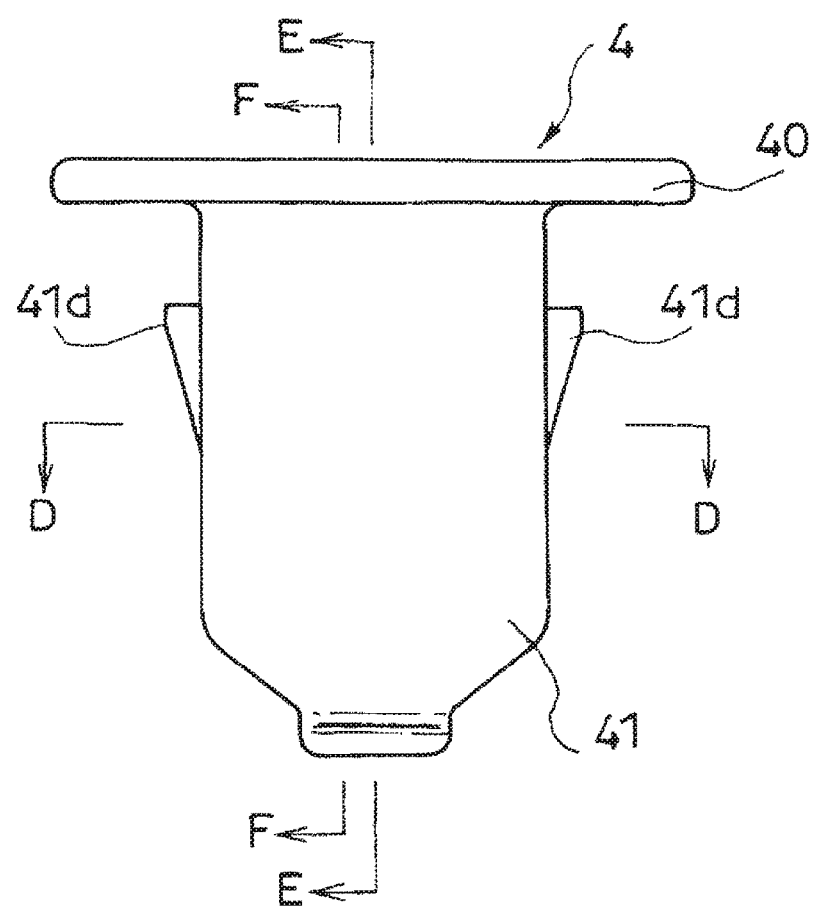
FIG. 12 is a side view of the grommet member viewed from a different direction.

In the illustrated example, the engagement portion 41d is formed by an elastic piece projecting toward the head portion 40 side from the edge portion facing the base portion 44 side of the grommet member 4 in the wall portion 41g. An inner face of the elastic piece is positioned on a face same as an inner face of the wall portion 41g. As shown in FIG. 10, an outer face of the elastic piece becomes an inclined face 41e gradually increasing a thickness of the elastic piece as separating from a connection side to the wall portion 41g.

Also, in the illustrated example, the engagement portion 41d is formed on one side sandwiching a straight line y (see FIG. 5) substantially dividing the long-side side face portion 41b of the center portion 41a into two to the right and left along the fitting direction x. Namely, the exit portion 41i of the insertion gap 41h is formed on the other side sandwiching the straight line y.

In the illustrated example, relative to the engagement portion 41d and the exit portion 41i formed on the outside of one of the two long-side side face portions 41b and 41b, the engagement portion 41d and the exit portion 41i formed on the outside of the other of the two long-side side face portions 41b and 41b are disposed in a point-symmetry position around a shaft center z (see FIG. 14) of the center portion 41a.

Figure 22:
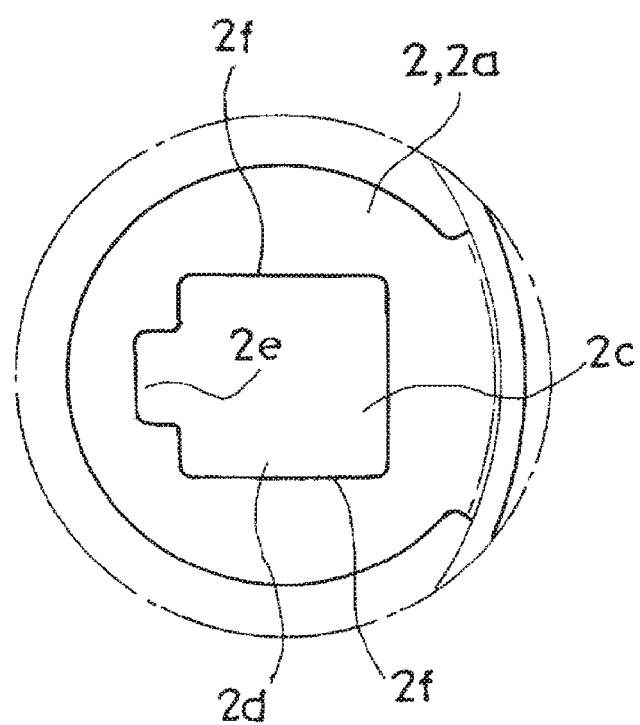
FIG. 22 is a plan view of essential parts of the attachment object showing an attachment hole for the grommet member of the clip for grounding, formed in the attachment object.

In the illustrated example, as shown in FIG. 22, the attachment hole 2c comprises a rectangular main hole portion 2d following the outline shape in cross section of the center portion 41a of the fitting portion 41; and a concave portion 2e formed at an intermediate position of one of two width-side hole edge portions of the main hole portion 2d. A distance between two length-side hole edge portions 2f and 2f of the main hole portion 2d is slightly smaller than a distance between the outer faces of the elastic pieces forming the two engagement portions 41d and 41d of the grommet member 4 on the base portion 44 side. Also, a distance between the head portion 40 of the grommet member 4 and an end portion of the elastic piece forming the engagement portion 41d on the base portion 44 side is substantially equal to a thickness of the fuel-filling-aperture forming member 2a at a portion forming the attachment hole 2c. Thereby, in the illustrated example, when the grommet member 4 is inserted into the attachment hole 2c from a vehicle outside of the automobile, the aforementioned insertion is allowed while bending the elastic pieces forming the two engagement portions 41d inwardly, and by a bending return of the elastic piece forming the engagement portion 41d at an insertion end position, the elastic piece forming the engagement portion 41d and the head portion 40 sandwich the portion forming the attachment hole 2c therebetween from the inside and outside, thereby fitting the grommet member 4 into the attachment hole 2c.

(Contact Member 5)

The contact member 5 is combined with the grommet member 4, and is formed by comprising the elastic contact portion 50 relative to the reference potential member 3 positioned on the fitting tip side Fw of the grommet member 4 (see FIG. 1 and FIG. 2).

Also, the contact member 5 includes a pair of elastic engagement pieces 51 and 51 to be inserted into the insertion gaps 41h formed between the center portion 41a and the wall portions 41g from the tip 43 side of the grommet member 4 (see FIG. 9). Then, the contact member 5 engages engagement portions 51b of the elastic engagement pieces 51 with the exit portion 41i of the insertion gaps 41h by an elastic return of the elastic engagement pieces 51 at an insertion end position into the insertion gaps 41h (see FIG. 10).

Also, the contact member 5 includes a pair of elastic clamping pieces 52 and 52 to be inserted into the insertion gaps 41h from the tip 43 side of the grommet member 4. Then, the contact member 5 is combined with the grommet member 4 in a state wherein the center portion 41a is clamped between the pair of elastic clamping pieces 52 and 52.

In the illustrated example, the contact member 5 is formed by cutting and folding a metal plate.

Figure 17:
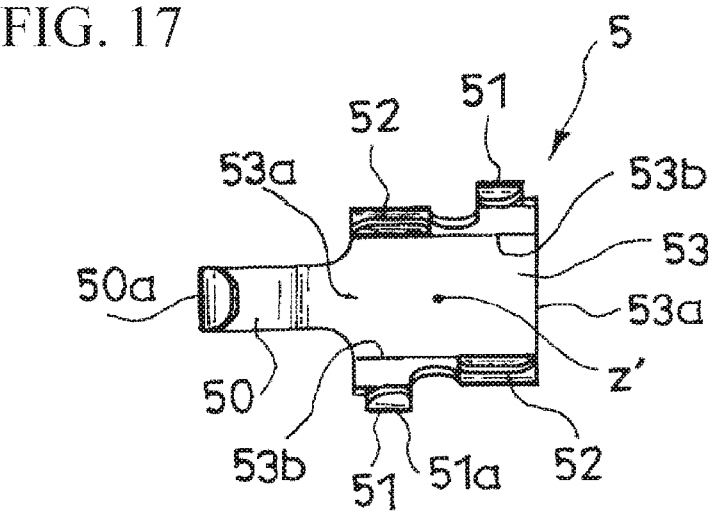
FIG. 17 is a plan view of a contact member forming the clip for grounding.

As shown in FIG. 17, the contact member 5 includes a base plate portion 53 having substantially a rectangular shape.

A base portion side of the elastic contact portion 50 having a band plate shape is integrally connected to one of two width-side side portions 53a and 53a of the base plate portion 53, and the elastic contact portion 50 has an arm shape projecting from the base plate portion 53. The elastic contact portion 50 projects in such a way so as to have an inclination which gradually increases a distance to the width-side side portion 53a of the base plate portion 53 as coming close to a tip thereof. Also, as shown in FIG. 18, the tip of the elastic contact portion 50 is folded on a width-side side portion 53a side of the base plate portion 53, and on an outside opposite to a side facing the base plate portion 53 in the elastic contact portion 50, there is formed a shoulder portion 50a by the aforementioned folding.

Figure 18:
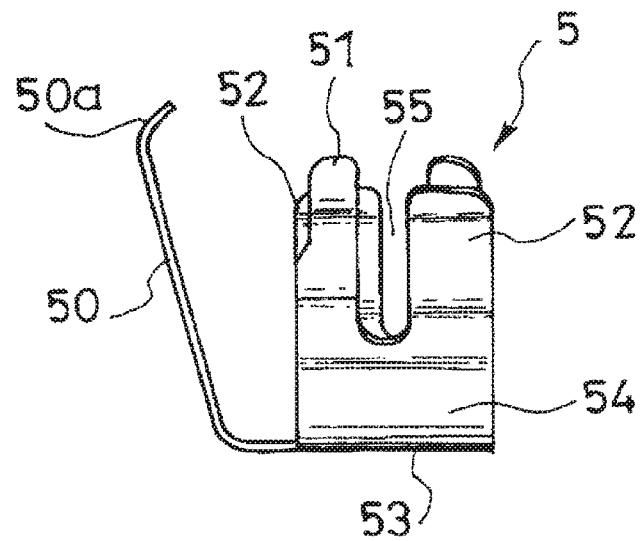
FIG. 18 is a side view of the contact member.
Figure 19:
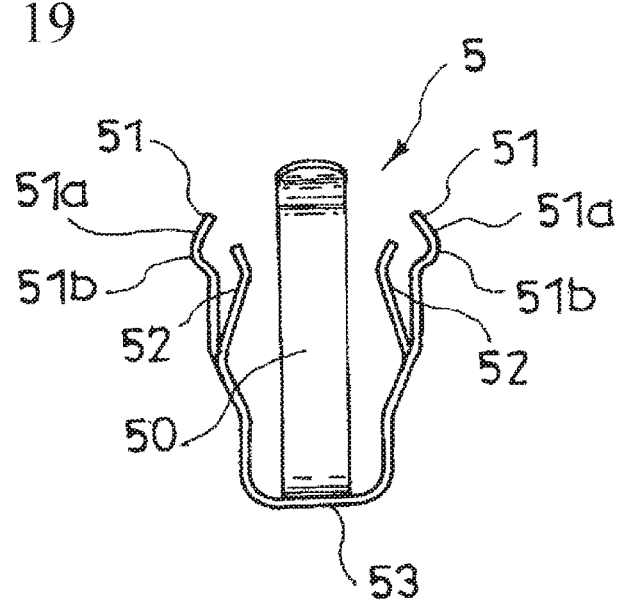
FIG. 19 is a side view of the contact member.
Figure 20:
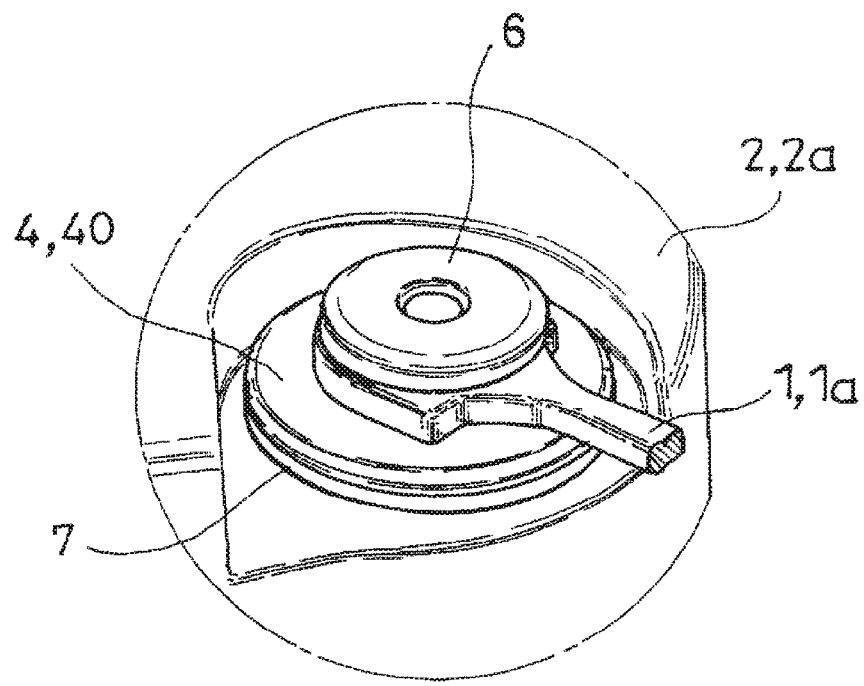
FIG. 20 is a perspective view of essential parts showing a state wherein one portion of a grounding processing object is linked to an attachment object through the clip for grounding.

Also, the contact member 5 comprises two rising portions 54 and 54 rising in a direction substantially orthogonal to the base plate portion 53 by bending two length-side side portions 53b and 53b of the base plate portion 53 as a bending portion (see FIG. 18). In the two rising portions 54 and 54, there are respectively formed division grooves 55 leading to an approximately middle position in a rising direction from a tip thereof, and by the division grooves 55, the elastic engagement pieces 51 and the elastic clamping pieces 52 are formed respectively in the two rising portions 54 and 54.

In the illustrated example, relative to the elastic engagement piece 51 and the elastic clamping piece 52 formed on one side of the two length-side side portions 53b of the base plate portion 53, the elastic engagement piece 51 and the elastic clamping piece 52 formed on one side of the two length-side side portions 53b of the base plate portion 53 are disposed in a point-symmetry position around a center z' (see FIG. 17) of the base plate portion 53.

In a state wherein the contact member 5 is viewed from the width-side side portion 53a side of the base plate portion 53 (see FIG. 19), the pair of elastic engagement pieces 51 and 51 has an embodiment gradually increasing a distance between the pair of elastic engagement pieces 51 and 51 as coming close to bending portions which become the engagement portions 51b formed on roughly an upper end side thereof. Upper sides relative to the bending portions which become the engagement portions 51b of the elastic engagement pieces 51 become insertion guide portions 51a inclining toward a direction of gradually reducing the distance between the pair of elastic engagement pieces 51 and 51.

On the other hand, in the state wherein the contact member 5 is viewed from the width-side side portion 53a side of the base plate portion 53 (see FIG. 19), the pair of elastic clamping pieces 52 and 52 has a structure gradually reducing a distance between the pair of elastic clamping pieces 52 and 52 as coming close to roughly a tip thereof.

When the base plate portion 53 of the contact member 5 faces the tip 43 of the grommet member 4, and the respective corresponding elastic engagement piece 51 and elastic clamping piece 52 are inserted into the two insertion gaps 41h of the grommet member 4 from the entrance portion 41j side, the pair of elastic clamping pieces 52 and 52 clamps the center portion 41a by respectively sliding to contact the long-side side face portions 41b of the center portion 41a. Thereby, the pair of elastic engagement pieces 51 and 51 respectively inserts the insertion guide portions 51a into the insertion gaps 41h without being caught on the entrance portions 41j of the insertion gaps 41h. When the elastic engagement piece 51 and the elastic clamping piece 52 are inserted into the insertion gap 41h to a position where the base plate portion 53 of the contact member 5 abuts against the tip 43 of the grommet member 4, the elastic engagement piece 51 bends outwardly, and the bending portion which becomes the engagement portion 51b is caught on the exit portion 41i of the insertion gap 41h so as to prevent the elastic engagement piece 51 and the elastic clamping piece 52 from coming out of the insertion gap 41h. Thereby, a combined state between the grommet member 4 and the contact member 5 is maintained.

The grommet member 4 and the contact member 5 are appropriately electrically connected by the elastic engagement piece 51 and the elastic clamping piece 52.

When the grommet member 4 fits into the attachment hole 2c, the elastic contact portion 50 advances to the fitting tip side Fw of the attachment hole 2c through the concave portion 2e. In the illustrated example, the elastic contact portion 50 advanced in the aforementioned manner contacts relative to an edge portion of the body panel 3a positioned on a vehicle inside of the fuel-filling-aperture forming member 2a in a state slightly elastically deformed in a direction of coming close to the base plate portion 53.

By a contact to the body panel 3a as the reference potential member 3 of the elastic contact portion 50, even in a case wherein the attachment hole 2c is provided in the fuel-filling-aperture forming member 2a as the attachment object 2, the tether 1a and the cap as the grounding processing object 1 can be appropriately electrically connected to the reference potential member 3 through the clip for grounding. Since the elastic contact portion 50 is formed by one portion of the contact member 5 made of metal, an elastic deformation force is difficult to be lost over time, and the elastic contact portion 50 continues to contact the body panel 3a as the reference potential member 3 with a fixed elastic force. Also, since the elastic contact portion 50 can contact the body panel 3a as the reference potential member 3 with the fixed elastic force, even in a case wherein there is a slight error in a positional relationship between the attachment hole 2c and a portion 3b which becomes a contact point for grounding the body panel 3a as the reference potential member 3, the aforementioned error is absorbed so as to contact the elastic contact portion 50 with the body panel 3a as the reference potential member 3.

In the illustrated example, relative to the grommet member 4 fitted into the attachment hole 2c, in a case wherein an external force large enough for pulling out the grommet member 4 fitted into the attachment hole 2c acts, by a shape of the shoulder portion 50a of the elastic contact portion 50 of the contact member 5, the elastic contact portion 50 passes the concave portion 2e while elastically deforming in the direction of coming close to the base plate portion 53, and comes out of the fuel-filling-aperture forming member 2a as the attachment object 2 together with the grommet member 4 without separating from the grommet member 4.

(Pin Member 6)

As shown in FIG. 1, the pin member 6 has a structure comprising a disk-shaped head portion 6a and a shaft portion 6b projecting from a center of one face side of the head portion 6a. There is formed a constriction portion 6c between a tip and a base portion of the shaft portion 6b. As shown in FIG. 13, inside the center portion 41a of the grommet member 4, there is formed a protrusion portion 41f relative to the constriction portion 6c. When the shaft portion 6b of the pin member 6 is inserted into the center portion 41a, the tip of the pin member 6 abuts against the protrusion portion 41f, and the center portion 41a elastically deforms to allow an insertion of the pin member 6 further inside. When the pin member 6 is inserted into the center portion 41a to a position of interposing one end portion of the tether 1a as one portion of the grounding processing object 1 between the head portion 6a of the pin member 6 and the head portion 40 of the grommet member 4, a center portion 41a side elastically returns, and the protrusion portion 41f engages the constriction portion 6c.

(Packing Member 7)

As shown in FIG. 1 and FIG. 2, the packing member 7 has a structure of sealing fluid-tightly between the flange 42 formed by the head portion 40 of the grommet member 4 and the attachment hole 2c. The packing member 7 includes a through hole 7a for the grommet member 4, which follows the outline shape in cross section of the center portion 41a, and is provided in the grommet member 4 in such a way so as to contact one surface thereof with the flange 42 by passing the fitting portion 41 of the grommet member 4 through the through hole 7a.

In a state wherein the tether 1a as one portion of the grounding processing object 1 is attached to the fuel-filling-aperture forming member 2a as the attachment object 2 as mentioned above, the rainwater and the like do not enter into the vehicle inside of the automobile through the center portion 41a of the grommet member 4. Therewith, the rainwater and the like do not enter into the vehicle inside of the automobile between the grommet member 4 and the attachment hole 2c as well by the packing member 7.

Incidentally, obviously, the present invention is not limited to the embodiment explained hereinabove, and includes all embodiments which can obtain the object of the present invention.

EXPLANATION OF SYMBOLS 1 a grounding processing object
2 an attachment object
2c an attachment hole
3 a reference potential member 4 a grommet member
5 a contact member
50 an elastic contact portion
Fw a fitting tip side Incidentally, the specification, claims, drawings, and abstract of Japanese Patent Application No. 2016-108855 filed on May 31, 2016 are cited in their entirety herein and are incorporated as a disclosure of the specification of the present invention.

What is claimed is:

1. A clip for grounding, comprising:
a grommet member made of a conductive resin, electrically connected to a grounding processing object, and fitted into an attachment hole formed in a nonconductive attachment object so as to link the grounding processing object to the attachment object; and
a contact member made of metal, assembled with the grommet member, and including an elastic contact portion relative to a reference potential member positioned on a fitting tip side of the grommet member,
wherein the grounding processing object is a cap of a fuel filling aperture of an automobile and a conductive tether connected to the cap,
the attachment object is a fuel-filling-aperture forming member wherein an inside thereof is an insertion space for a fueling gun, and
the reference potential member is a body panel of the automobile.

2. A clip for grounding according to claim 1, wherein the grommet member includes wall portions respectively on two sides sandwiching a center portion thereof,
the contact member includes a pair of elastic engagement pieces to be inserted into an insertion gap formed between the center portion and the wall portions from a tip side of the grommet member, and
by an elastic return of the elastic engagement piece at an insertion end position into the insertion gap, an engagement portion of the elastic engagement piece engages an exit portion of the insertion gap.

3. A clip for grounding according to claim 2, wherein the contact member includes a pair of elastic clamping pieces to be inserted into the insertion gap from the tip side of the grommet member, and
in a state wherein the center portion is clamped between the pair of elastic clamping pieces, the contact member is combined with the grommet member.

4. A clip for grounding, comprising:
a grommet member made of a conductive resin, electrically connected to a grounding processing object, and fitted into an attachment hole formed in a nonconductive attachment object so as to link the grounding processing object to the attachment object; and
a contact member made of metal, assembled with the grommet member, and including an elastic contact portion relative to a reference potential member positioned on a fitting tip side of the grommet member,
wherein a center portion of the grommet member has a cylindrical shape in which a tip side of the grommet member is closed, and a base portion side is open, and includes a pin member to be fitted into the center portion from the base portion side, and
the pin member inserted to pass through a hole formed in one portion of the grounding processing object fits into the center portion to thereby electrically connect the grounding processing object and the grommet member.

5. A clip for grounding according to claim 4, wherein the grommet member includes a flange on the base portion side, and
a packing member for sealing fluid-tightly between the flange and the attachment hole is provided.

* * * * *